United States Patent [19]

Tracy

[11] Patent Number: 4,559,677
[45] Date of Patent: Dec. 24, 1985

[54] STRETCHABLE TIE-DOWN DEVICE

[76] Inventor: Richard J. Tracy, 1002 Forest Dr., Elgin, Ill. 60120

[21] Appl. No.: 615,862

[22] Filed: May 31, 1984

[51] Int. Cl.⁴ .............................................. B65D 63/00
[52] U.S. Cl. ........................................ 24/300; 24/700; 248/499
[58] Field of Search ................... 248/499, 500; 24/301, 24/302, 298, 300, 297, 277, 453, 700; 403/287, 284

[56] References Cited

U.S. PATENT DOCUMENTS

| | | | |
|---|---|---|---|
| 1,313,113 | 8/1919 | Pleister | 248/903 X |
| 1,980,426 | 11/1934 | Noyes | 403/284 X |
| 2,841,349 | 7/1958 | Charles | 24/298 X |
| 3,341,261 | 9/1967 | Fenlin | 403/277 X |
| 3,858,848 | 1/1975 | MacFetrich | 403/277 X |

FOREIGN PATENT DOCUMENTS

| | | | |
|---|---|---|---|
| 758355 | 11/1933 | France | 411/339 |
| 958406 | 3/1950 | France | 24/300 |
| 2447871 | 10/1980 | France | 24/300 |
| 15615 | 11/1897 | Switzerland | 403/277 |
| 339696 | 12/1930 | United Kingdom | 24/302 |

Primary Examiner—J. Franklin Foss
Attorney, Agent, or Firm—Bernard L. Kleinke

[57] ABSTRACT

A stretchable tie-down device includes an elongated resilient stretchable tube, which is thin walled and pliable to collapse and flatten readily when pressed against a surface for gripping it frictionally and snugly. At least one hook member is fixed to the tube at one end thereof by means of a plug, which is disposed within the tube and for fixing it to the tube. The tube has a non-circular cross-sectional configuration throughout its length to provide a substantial surface area for facilitating the gripping of surfaces with the cord device. The hook member includes a flat metal hook having an outer coating of thermoplastic material thereon.

17 Claims, 11 Drawing Figures

STRETCHABLE TIE-DOWN DEVICE

DESCRIPTION

1. Technical Field

The present invention relates in general to a stretchable tie-down device, and it more particularly relates to such a tie-down device in the form of a bungee type shock cord device.

2. Background Art

There have been many different types and kinds of tie-down devices or the like. For example, reference may be made to the following U.S. Pat. Nos. 2,117,322; 2,805,058; 2,888,257; 3,012,806; 3,931,656; and 4,044,415.

The familiar conventional bungee type shock cord device, includes an elastic cord, which is circular in cross-section throughout its length, and has a pair of plasticcoated wire hooks secured to the opposite ends thereof. While such a device may be satisfactory for some applications, the bungee type shock cord devices have not been entirely satisfactory in that they have tended to fray and eventually break, due to abrasion with the surface being secured in place by the device. Also, the elastic cord portion of the device frequently tends to slip relative to the surface of the object being secured thereby, and thus the object can shift or become loose.

The hooks additionally tend to bend out of shape, and the points frequently poke through the plastic coating, thereby tending to scratch or mar a surface. The conventional bungee type shock cord device is bulky to store, when used on small vehicles, such as motorcycles.

Therefore, it would be highly desirable to have a new and improved elastic tie-down device, which does not readily become abraded during use, and frictionally grips a surface in a more secure manner. Also, the hooks or other fastening devices should remain intact and not cause unwanted scratching or marring of surfaces, or otherwise become bent out of shape. Such a new and improved device should be compact in size and thus be able to be stored conveniently. Also, for use aboard boats or ships, the new and improved device should be floatable so that in the case where it would become inadvertently thrown overboard, it would float and thus be readily retreivable.

DISCLOSURE OF INVENTION

Therefore, it is the principal object of the present invention to provide a new and improved stretchable tie-down device, which does not readily become abraded during use, and which frictionally grips a surface in a very tight and secure manner.

Another object of the present invention is to provide such a new and improved stretchable tie-down device, which includes sturdy hook members, and which is adapted to float.

Briefly, the above and further objects of the present invention are realized by providing a new and improved stretchable tie-down device, which is composed primarily of thermoplastic material.

A stretchable tie-down device includes an elongated resilient stretchable tube, which is thin walled and pliable to collapse and flatten readily when pressed against a surface for gripping it frictionally and snugly. At least one hook member is fixed to the tube at one end thereof by means of a plug, which is disposed within the tube and for fixing it to the tube. The tube has a non-circular crosssectional configuration throughout its length to provide a substantial surface area for facilitating the gripping of surfaces with the cord device. The hook member includes a flat metal hook having an outer coating of thermoplastic material thereon.

Due to the collapsibility of the tube, the device readily and securely grips a surface without tending to fray or to become abraded. The tube is hollow throughout its length to define a sealed chamber, thereby enabling the device to float.

Should, for any reason, the tube break or otherwise become severed, it can be readily fused together by the application of suitable heat to repair it in a convenient manner. The hooks include reinforcing flat metal hooks, which are composed of hardened material to render the hook very stiff and rigid, thereby preventing it from bending out of shape. The plastic coating is sufficiently thick to protect against the metal hook from being exposed inadvertently.

The collapsible tube portion of the device enables it to be folded and compressed into a small space in a compact manner for storage purposes.

BRIEF DESCRIPTION OF DRAWINGS

The above-mentioned and other objects and features of this invention and the manner of attaining them will become apparent, and the invention itself will be best understood by reference to the following description of embodiments of the invention when taken in conjunction with the accompanying drawings, wherein.

BEST MODE FOR CARRYING OUT THE INVENTION

Figure 1:
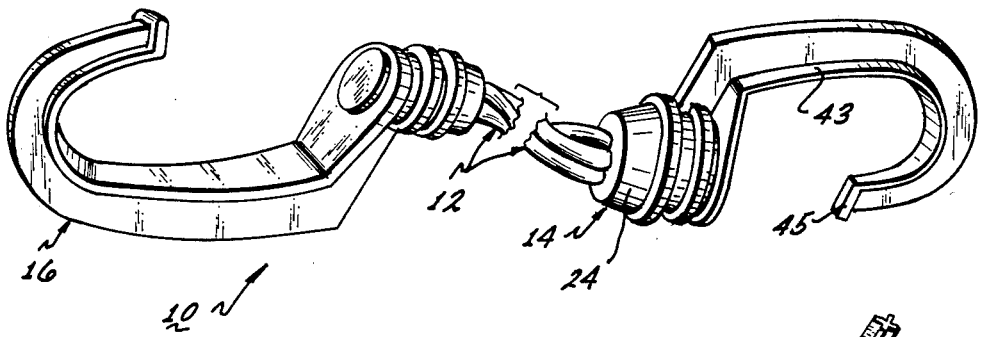
FIG. 1 is a pictorial, fragmentary view of a stretchable tie-down device, which is constructed in accordance with the present invention and which shows the cord portion thereof twisted end to end for illustration purposes.
Figure 2:
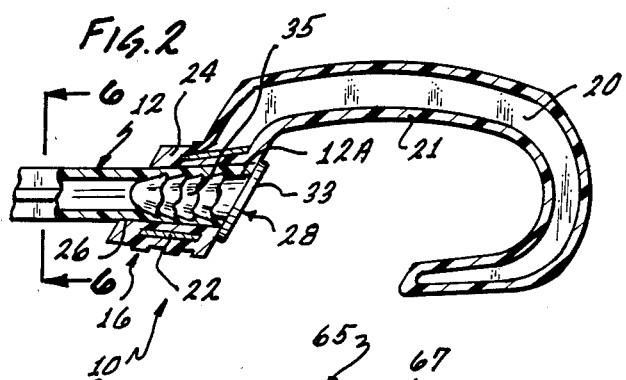
FIG. 2 is an enlarged, fragmentary sectional view of a hook portion of the device of FIG. 1.
Figure 3:
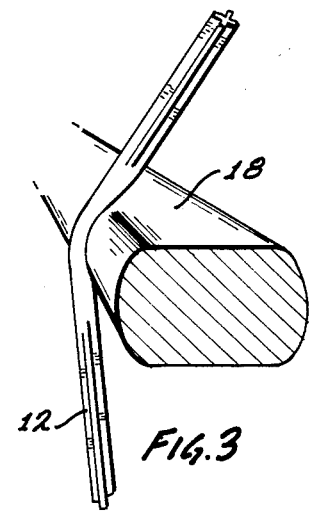
FIG. 3 is a fragmentary view of the device of FIG. 1, illustrating the device in use.

Referring now to FIGS. 1, 2, 3, 4, 5 and 6 of the drawings, there is shown a stretchable tie-down device 10, which is constructed in accordance with the present invention, and which is adapted to secure an object, such as the object 18 of FIG. 3. The device 10 generally comprises a hollow elongated thin-walled stretchable tube 12, which has a pair of hooklike members 14 and 16 affixed to the opposite ends thereof. While two hook members are shown and described herein, it is to be understood that only hook member may be employed, if desired.

Figure 4:
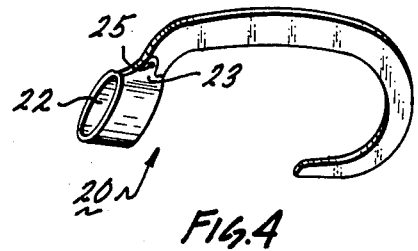
FIG. 4 is a pictorial view of a reinforcing hook portion of one of the hook members of the device shown in FIG. 1.

Considering now the hook member 14 in greater detail, the hook member 14 is generally similar to the hook member 16, which will not be described in greater detail. The hook member 14 includes an inner flat metal reinforcing hook 20, which has an outer coating 21 composed of thermoplastic material. As best seen in FIG. 4, the reinforcing hook 20 includes an inner sleeve 22 at the shank portion thereof, disposed within a plastic outer sleeve 24 (FIG. 2) of the coating 21. The inner sleeve 22 is formed of an integral distal end portion 23, which is bent into a tubular configuration and spot-welded at 25 to maintain the tubular configuration.

An end 12A of the tube 12 is disposed within a tapered bore 26 (FIG. 2), which is open at its opposite ends, and which is disposed within the outer plastic sleeve 24. the tube 12A extends into the rear end of the bore 26 and terminates at the opposite end thereof. A retainer plug 28 is wedged into the end portion 12A of the tube 12 to fix the hook member 14 to the tube 12. In this manner, the tube 12 cannot be backed out of the plastic sleeve 24, under normal loading conditions.

Figure 5:
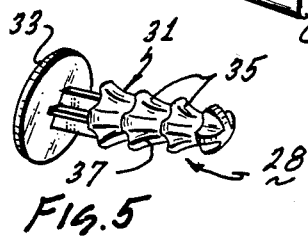
FIG. 5 is a pictorial, enlarged-scale view of a retainer plug of the hook member of FIG. 2.

The retainer plug 28 generally comprises a body portion 31, which has a large circular flat head 33. The head 33 is substantially larger in diameter than the inside diameter of the tapered bore at its largest diameter adjacent to the head 33. A series of axially spaced apart tapered portions 35 provide a stepped surface to help secure the plug in position. Each one of the tapered portions 35 is cruciform in cross-sectional shape throughout its axial length, to provide outwardly flared portions or nodes, such as the node 37 (FIG. 5). In this regard, the cross-sectional configuration of the plug 31 is generally similar to the cross-sectional configuration of the tube 12. The plug 28 is smoothly contoured to prevent it from tearing or otherwise cutting into the tube end 12A.

Figure 6:
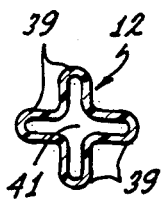
FIG. 6 is an enlarged sectional view of the device of FIG. 2. taken substantially on line 6—6 thereof.

As best seen in FIG. 6, the tube 12 is thin-walled and is flexible and pliable. The tube 12 is generally cruciform in configuration throughout its length, and has a series of four lobes 39.

The cruciform configuration allows the outer surface of the tube 12 to have a substantial surface area for gripping the surface 18. Also, the hollow tubular configuration enables the tube 12 to have greater structural strength due to its internal surface area.

A sealed hollow compartment 41 at the interior of the tube 12 traps a fluid, such as air therein, to enable the device 10 to be buoyant and thus floatable. The plugs, such as the plug 28, at the opposite ends of the tube 12 seal the compartment 41.

Should the tube 12 become fractured or otherwise severed, it can be mended by fusing it together in the presence of suitable heat. The tube 12 is extruded and is composed of a stretchable thermal plastic elastomeric material, such as a suitable thermoplastic urethane material. A preferred such material can be obtained from V.E.S. Company, located at 4295 Danberry Drive, North Olmstead, Ohio 44070.

Considering now the hook member 14 in greater detail with particular reference to FIG. 1, the outer plastic coating 21 includes a plastic bearing surface or flange 43 extending on the underside of a hook member 14. The flange 43 terminates at an enlarged protective tip portion 45 (FIG. 1).

The flat metal reinforcing hook 20 is made from a flat metal stamping, and is formed into the shape as shown in the drawings. In this regard, the inner sleeve 22 is shaped into a tubular configuration having a circular cross-sectional shape.

Once formed, the hook 20 is heat treated to be spring tempered. In this regard, the hook 20, once formed, is heated and then quenched in a suitable liquid to enable it to become very hard. Thereafter, it is heated again, and allowed to cool to room temperature for the purpose of providing the hook 20 with suitable toughness.

Once the hook 20 is heat-treated in this manner, the outer plastic coating 21 is applied to a suitable thickness, as indicated in the drawings, to provide the hook member with the desired configuration.

Figure 7:
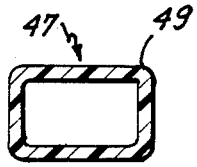
FIG. 7 is a sectional view of another stretchable tie-down device, which is constructed in accordance with the present invention.

Referring now to FIG. 7, there is shown a tie-down device 47, which is also constructed in accordance with the present invention, and which shows only the cross-sectional configuration of its hollow, thin walled tube 54. In this regard, the device 47 only differs from the device 10 in the cross-sectional shape of the tube 54.

The tube 49 is also non-circular in cross-sectional configuration throughout its length, and in particular, is rectangular in cross-sectional shape. In this manner, the tube 49 readily collapses and flattens for gripping a surface, and snugly grips the surface due to the outer surface area of the tube 29.

Figure 8:
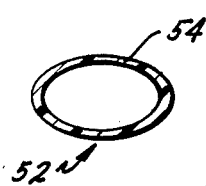
FIG. 8 is a sectional view of still another stretchable tie-down device, which is constructed in accordance with the present invention.

Referring now to FIG. 8, there is shown another tie-down device 52 which includes a hollow thin-walled tube 54, and which is constructed in accordance with the present invention. Only the cross-sectional shape of the tube 54 is illustrated, it being understood that the hook members (not shown) are similar to the hook members 14 and 16.

The cross-sectional area of the tube 54 is also non-circular in shape, and is oval throughout its length.

Figure 9:
FIG. 9 is a sectional view of a further stretchable tie-down device, which is constructed in accordance with the present invention.

Referring now to FIG. 9, there is shown in another tie-down device 56, which is constructed in accordance with the present invention, and which includes a tube 58 of non-circular cross-sectional shape. The cross-sectional shape of the tube 58 is triangular. The hook members (not shown) for the device 56 are similar to the hook members 14 and 16.

Figure 10:
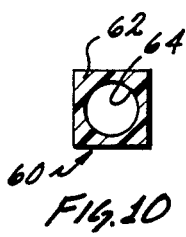
FIG. 10 is a sectional view of yet another stretchable tie-down device, which is constructed in accordance with the present invention.

Referring now to FIG. 10, there is shown a further stretchable tie-down device 60, which includes a thin-walled plastic tube 62. The tube 62 is also non-circular in cross-sectional configuration, and is square in cross-section outer shape throughout its length. The tube 62 and has a circular cross-sectional inside opening 64. Thus, the inside cross-sectional shape is different from the outside cross-sectional shape.

Figure 11:
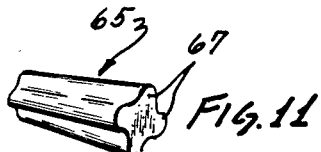
FIG. 11 is a pictorial view of another retainer plug for use with the tie-down device of FIG. 1.

Referring now to FIG. 11, there is shown another retention plug 65, which is constructed according to the present invention, and which may be used in place of the plug 28 in the device 10. The plug 65 is headless, and is tapered in shape. It has a cruciform cross-sectional shape throughout its length, and has a series of four smoothly rounded nodes 67.

In use, once the end 12A is inserted into the rear opening in the plastic sleeve bore 26 and extends into the position as shown in FIG. 2, the plug 65 is inserted into the inside of the tube end 12A through the opposite opening of the bore 26, until the plug 65 is fully inserted in place within the tube end 12A. Thereafter, suitable heat is applied to the larger end of the plug 65 to fuse it with the adjacent portions of the plastic coating 21. In this manner, the compartment within the tube 12 is sealed off by the fusing operation.

While particular embodiments of the present invention have been disclosed, it is to be understood that various different modifications are possible and are contemplated within the true spirit of the appended claims. For example, different types and kinds of materials may be employed for at least some of the various parts of the stretchable tie-down device of the present invention. Also, various different non-circular configurations may be employed for the tube of the device of the present invention. Moreover, it is to be understood that the cross-sectional shape of the inside surface of the tube may be different from the cross-sectional configuration of the outside surface of the tube. There is no intention, therefore, of limitations to the exact abstract or disclosure herein presented.

I claim:

1. A stretchable tie-down device, comprising:
an elongated resilient stretchable tube composed of thermoplastic material, said tube having first and second ends, said tube being thin walled and pliable to collapse and flatten readily when passed against a surface for gripping it frictionally and snugly;
at least one hook member fixed to one of said ends;
plug means disposed within said one of said ends for fixing said hook member to said tube, wherein said hook member includes a hood portion having a sleeve portion for receiving the end of said tube, and said plug means is insertable through the forward end of said sleeve portion, wherein said sleeve portion includes a tapered bore converging from front to rear to fix securely the end of the tube therein for tending to prevent it from backing out of said sleeve portion, wherein said plug means includes an elongated plug having an outer cross-sectional configuration extending throughout its axial length in a shape complementarily relative to the cross-sectional configuration of the inside surface of the tube, said sleeve portion being molded and integrally connected to and extending from the rear end portion of said hook portion; said sleeve portion having a pair of front and rear unobstructed openings; said front opening being dimensioned to receive the rear end of said plug means; said rear opening being dimensioned to receive an end portion of the tube; said tube being internally dimensioned to receive the rear end of said plug means to compress said end portion of said tube against the inside surface of said sleeve portion.

2. A stretchable tie-down device according to claim 1, wherein said tube includes means defining a sealed chamber disposed therein for confining fluid therein to enable said cord device to be floatable.

3. A stretchable tie-down device according to claim 1, wherein said plug includes a series of tapered shaped portions to provide a stepped surface.

4. A stretchable tie-down device according to claim 3, wherein said plug includes a head portion for remaining outside said sleeve portion.

5. A stretchable tie-down device according to claim 3, wherein said plug is completely insertable within said tube and said sleeve portion to enable said plug and said sleeve portion to be heat welded together.

6. A stretchable tie-down device according to claim 1,
wherein said tube is hollow throughout its length and has a non-circular cross-sectional configuration throughout its length to provide substantial surface area for facilitating the gripping of surfaces with said device.

7. A stretchable tie-down device according to claim 4, wherein said cross-sectional configuration includes a plurality of external lobes.

8. A stretchable tie-down device according to claim 7, wherein said plurality of lobes comprises four lobes, each one of said lobes is smoothly rounded.

9. A stretchable tie-down device according to claim 6, wherein said configuration is rectangular in shape.

10. A stretchable tie-down device according to claim 6, wherein said configuration is triangular in shape.

11. A stretchable tie-down device according to claim 6, wherein said configuration is oval in shape.

12. A stretchable tie-down device according to claim 1,
wherein at least one hook member is fixed to one of said ends, said hook member includes a flat metal hook, and an outer coating of thermoplastic material, said metal hook being composed of hardened material to reinforce said hook member, said hook having a sleeve at the rear end thereof, said sleeve being covered with said outer coating to form said sleeve portion.

13. A stretchable tie-down device according to claim 12, wherein said sleeve includes a body portion and is formed of an integrally connected strip of metal formed into a tubular configuration.

14. A stretchable tie-down device according to claim 13, wherein said strip includes a distal end portion welded to said body portion.

15. A stretchable tie-down device according to claim 12, wherein said outer coating includes a generally flat flange on the underside thereof for load distributing purposes.

16. A stretchable tie-down device according to claim 12, wherein said cord includes a tube, said tube is thin walled and pliable to collapse and flatten readily when pressed against a surface for gripping it frictionally and snugly.

17. A stretchable tie-down device according to claim 16, wherein said tube has a non-circular cross-sectional configuration throughout its length.

* * * * *

UNITED STATES PATENT AND TRADEMARK OFFICE
CERTIFICATE OF CORRECTION

PATENT NO. : 4,559,677
DATED : December 24, 1985
INVENTOR(S) : Richard J. Tracy

It is certified that error appears in the above–identified patent and that said Letters Patent are hereby corrected as shown below:

Column 1, line 47 -- change "retreivable" to "retrievable".

Column 3, line 24 -- change "the tube 12A" to "The tube 12A"

Column 5, line 26 -- change "passed" to "pressed"

Column 5, line 31 -- change "hood" to "hook"

Signed and Sealed this

Twenty-second Day of July 1986

[SEAL]

Attest:

Attesting Officer

DONALD J. QUIGG

Commissioner of Patents and Trademarks